United States Patent
Iyengar et al.

(10) Patent No.: US 12,410,999 B2
(45) Date of Patent: Sep. 9, 2025

(54) NON-DESTRUCTIVE TESTING METHOD

(71) Applicant: AIRBUS OPERATIONS LIMITED, Bristol (GB)

(72) Inventors: Parthasarathy Iyengar, Bristol (GB); George Daniel Monks, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 266 days.

(21) Appl. No.: 17/961,157

(22) Filed: Oct. 6, 2022

(65) Prior Publication Data

US 2023/0114974 A1 Apr. 13, 2023

(30) Foreign Application Priority Data

Oct. 7, 2021 (GB) ..................................... 2114348

(51) Int. Cl.
  *G01B 7/16* (2006.01)
  *B64F 5/60* (2017.01)
  *G01M 5/00* (2006.01)

(52) U.S. Cl.
  CPC .................. *G01B 7/18* (2013.01); *B64F 5/60* (2017.01); *G01M 5/0041* (2013.01)

(58) Field of Classification Search
  CPC .... G01B 7/18; B64F 5/60; B64F 6/40; G01M 5/0041; G01M 5/0033; G01M 5/0083; G01N 27/20
  See application file for complete search history.

(56) References Cited

U.S. PATENT DOCUMENTS

| | | | |
|---|---|---|---|
| 8,451,013 B1 | 5/2013 | Hsiao | |
| 9,638,654 B2* | 5/2017 | Baileys | G01N 33/44 |
| 11,002,701 B2 | 5/2021 | Marya et al. | |
| 2004/0066188 A1* | 4/2004 | Goldfine | G01N 27/20 |
| | | | 324/228 |
| 2006/0254366 A1 | 11/2006 | Williamson et al. | |
| 2011/0291802 A1 | 12/2011 | Fay et al. | |
| 2015/0274312 A1 | 10/2015 | Conrad | |
| 2018/0202959 A1* | 7/2018 | Mitchell | G01M 5/0016 |
| 2019/0317026 A1 | 10/2019 | Hu et al. | |
| 2022/0221355 A1 | 7/2022 | Fowler et al. | |

FOREIGN PATENT DOCUMENTS

| | | |
|---|---|---|
| CN | 102878920 | 1/2013 |
| CN | 112285162 | 1/2021 |
| EP | 2 392 905 | 12/2011 |
| EP | 3 348 984 | 7/2018 |
| GB | 2 405 934 | 3/2005 |
| WO | 2020/165670 | 8/2020 |

OTHER PUBLICATIONS

Search Report for GB2114348.2, dated Apr. 6, 2022, 2 pages.
European Search Report cited in EP 22 19 9663, mailed Jan. 23, 2023, 2 pages.

* cited by examiner

*Primary Examiner* — David Z Huang
(74) *Attorney, Agent, or Firm* — Nixon & Vanderhye P.C.

(57) ABSTRACT

A method of examining the integrity of an aircraft structure including determining an electrical conductivity or resistivity of the metal matrix composite of the aircraft structure. An apparatus for performing such a method is also provided. A method of estimating damage in an aircraft structure and a method of estimating the remaining operational life of an aircraft structure are also provided.

12 Claims, 11 Drawing Sheets

NON-DESTRUCTIVE TESTING METHOD

RELATED APPLICATION

This application incorporates by reference and claims priority to United Kingdom Patent application GB 2114348.2, filed Oct. 7, 2021.

BACKGROUND

The present disclosure relates to methods of testing metal matrix composite materials.

The present invention concerns the testing of metal matrix composite materials. More particularly, but not exclusively, this invention concerns a method of examining the integrity of an aircraft structure comprising metal matrix composite. The invention also concerns a method of estimating damage in an aircraft structure comprising metal matrix composite, a method of estimating the remaining operational life of an aircraft structure comprising metal matrix composite, an apparatus for performing such methods, an apparatus configured to estimate damage in an aircraft structure comprising metal matrix composite and an apparatus configured to estimate the remaining operational life of an aircraft structure comprising metal matrix composite Aircraft structures comprising metal matrix composite (MMC) are well-known. The composite in the present context typically comprises a reinforcing material laid out as per a desired plan in a metallic matrix. The reinforcing material may be continuous, typically in the form of long filaments, or long or continuous fibres. The fibres or filaments are typically alumina, silicon carbide or carbon fibre. The metal matrix may, for example, comprise aluminium or an aluminium alloy.

Structures comprising MMCs can be designed to endure better than many other types of metallic materials when subjected to cyclic, random or spectrum loading. However, it is desirable for aircraft manufacturers, repairers and servicing organisations to be able to determine the extent of damage upon a given aircraft structure. It is also desirable to be able to estimate the remaining lifetime of an aircraft structure. There are currently many ways of determining whether or not an MMC structure is becoming fatigued or otherwise damaged, such as Computer Tomography, Scanning Electron Microscopy, Transmission Electron Microscopy, Optical microscopy, X-ray diffraction and Energy Dispersive Spectrometry. Some such techniques are specialist in nature and require expensive equipment. Some of those techniques require samples to be taken from the aircraft structure and are therefore somewhat destructive in nature. One may also examine the stresses to which aircraft structures are subjected, for example by the use of a strain gauge. Strain gauges may only measure surface strain and may not determine whether an aircraft structure is damaged.

The present invention seeks to mitigate the above-mentioned problems and/or provide an improved method of assessing the integrity of an aircraft structure comprising metal matrix composites.

SUMMARY

In accordance with a first aspect of the present invention, there is provided a method of assessing the integrity of an aircraft structure comprising metal matrix composite, the method comprising determining an electrical conductivity or resistivity of the metal matrix composite, and assessing the integrity of the aircraft structure from the determined electrical conductivity or resistivity.

The applicant has unexpectedly determined that it is possible to examine the integrity of an aircraft structure comprising metal matrix composite simply by determining an electrical conductivity or resistivity of the metal matrix composite. Those skilled in the art will realise that conductivity is the reciprocal of resistivity, and determination of one of the conductivity or resistivity effectively determines the other of the conductivity and resistivity.

For the avoidance of doubt, those skilled in the art will realise that reference herein to "conductivity" and "resistivity" is to "electrical conductivity" and "electrical resistivity" unless the context requires otherwise. Furthermore, if reference is made solely to "electrical conductivity" or "electrical resistivity" without reference to the other of electrical conductivity or electrical resistivity, then reference to the other is implied, unless the context requires otherwise. Similarly, if reference is made solely to "conductivity" or "resistivity" without reference to the other of conductivity or resistivity, then reference to the other is implied, unless the context requires otherwise.

Assessing the integrity of the aircraft structure may, for example, comprise estimating damage to the aircraft structure and/or estimating remaining operational life of the aircraft structure.

The method of the first aspect of the present invention is concerned with examining the integrity of an aircraft structure comprising metal matrix composite, and in particular examining the integrity of the metal matrix composite itself. Optionally, at least 40% of the volume of the aircraft structure under test is formed from metal matrix composite, optionally at least 50%, optionally at least 60%, optionally at least 70%, optionally at least 80%, optionally at least 90%, optionally at least 95%, optionally at least 97%, optionally at least 98%, optionally at least 99% and optionally at least 99.5% of the volume of the aircraft structure is formed from metal matrix composite. The aircraft structure may comprise coatings and the like formed on the metal matrix composite.

The method may comprise determining an electrical conductivity or resistivity of the aircraft structure in situ. In this case, the aircraft structure remains as part of the aircraft while the determination of electrical conductivity or resistivity is made. The method may comprise determining an electrical conductivity or resistivity of an aircraft structure while the aircraft structure is removed from the aircraft.

The aircraft structure of which the electrical conductivity or resistivity is determined may optionally be an aircraft structure that has been subjected to manufacturing, handling or service stress, for example, from repeated loading associated with flight.

The method may comprise determining a first electrical conductivity or a first set of electrical conductivities at a first point in time. The method may comprise determining a second electrical conductivity or a second set of electrical conductivities at a second point in time, the aircraft structure optionally having been subjected to stress since the first point in time. The method may comprise comparing the first electrical conductivity with the second electrical conductivity, and optionally from said comparison, assessing the integrity of the aircraft structure. Assessing the integrity of the aircraft structure may comprise estimating damage to the aircraft structure and/or estimating remaining operational life of the aircraft structure. For the avoidance of doubt, "damage" in this sense is typically not limited to the type of damage associated with failure of the aircraft structure;

"damage" in this sense includes microscopic damage, typically associated with exposure to the repeated application and release of stress, that is typically not catastrophic but may limit the operational lifetime of an aircraft structure. The method may comprise comparing the first set of electrical conductivities with the second set of electrical conductivities, and optionally from said comparison, assessing the integrity of the aircraft structure, for example, estimating damage to the aircraft structure and/or estimating the remaining operational life of the aircraft structure. The first set of electrical conductivities may comprise determining electrical conductivity at a plurality of spatially-separated positions on the aircraft structure, optionally on a first side of the aircraft structure. The second set of electrical conductivities may comprise determining electrical conductivity at said plurality of spatially-separated positions on the aircraft structure, said plurality of spatially-separated positions being the same plurality of spatially-separated positions as the first set of electrical conductivities, optionally on the first side of the aircraft structure. The method may therefore comprise determining the electrical conductivity of the aircraft structure in lots of positions on the aircraft structure at different points in time, and on the same side of the aircraft structure, and seeing how the electrical conductivity at all those points varies over time.

The method may comprise determining a first set of electrical conductivities or resistivities, thereby determining electrical conductivity or resistivity at a plurality of spatially-separated positions on the aircraft structure. The method may comprise assessing the integrity of the aircraft structure, for example, estimating damage to the aircraft structure and/or estimating remaining life of the aircraft structure from the first set of electrical conductivities or resistivities. The method may comprise comparing the first set of electrical conductivities or resistivities to a set of electrical conductivities or resistivities indicative of an as-manufactured aircraft structure. In this context "as-manufactured" refers to an aircraft structure that has been manufactured to requirements, and has not been installed on an aircraft. The set of electrical conductivities or resistivities indicative of an as-manufactured aircraft structure may comprise measured and/or calculated electrical conductivity or resistivity values. Typically, the first set of electrical conductivities or resistivities are obtained from a first side of the aircraft structure, and may be compared with a set of electrical conductivities or resistivities indicative of an as-manufactured aircraft structure, and taken from the first side of the as-manufactured aircraft structure.

The method may comprise comparing the electrical conductivity or resistivity with a value indicative of an electrical conductivity or resistivity of an as-manufactured aircraft structure. The as-manufactured aircraft structure may be substantially the same as the aircraft structure for which the electrical conductivity or resistivity has been determined, save that the as-manufactured aircraft structure has not been subjected to post-manufacture stress, such as static loading stress and/or in-flight stress. The aircraft structure under test may or may not have been subjected to post-manufacture stress, such as in-flight stress. The value indicative of an electrical conductivity or resistivity of an as-manufactured aircraft structure may be a measured value or a calculated value, for example. The value indicative of an electrical conductivity or resistivity of an as-manufactured aircraft structure may have been stored electronically, for example, as part of a database.

The method may comprise comparing the electrical conductivity or resistivity with a value indicative of an electrical conductivity or resistivity of an as-manufactured aircraft structure, and based on said comparison, assessing the integrity of the aircraft structure, for example, estimating the damage to the aircraft structure and/or estimating remaining operational life of the aircraft structure. Estimation of damage may, for example, comprise estimating whether or not there has been damage. Alternatively or additionally, estimate of damage may comprise estimating a quantum of damage. Estimating remaining operational life may, for example, comprise estimating whether or not the aircraft structure has any remaining operational life. Alternatively or additionally, estimating remaining operational life may, for example, comprise estimating a quantum of remaining operational life. Typically, the electrical conductivity of an aircraft structure that is damaged, for example, by being subjected to repeated stress, is greater than a corresponding aircraft structure that has not been subjected to stress. For example, if the electrical conductivity of the aircraft structure under test is greater than the as-manufactured aircraft structure, and optionally above a minimum threshold value, then this may be indicative that the aircraft structure under test is, to some extent, damaged. Those skilled in the art will realise that one may place a minimum threshold value on the conductivity measurement that would be deemed to be indicative of damage.

The method may comprise comparing the electrical conductivity or resistivity with one or more pre-determined values indicative of those from stressed or damaged samples. The one or more pre-determined values indicative of those from stressed or damaged samples are optionally pre-determined values relating to the same side of a sample from which the measured electrical conductivity or resistivity was determined. The one or more pre-determined values indicative of those from stressed or damaged samples may be measured or calculated values. For example, the method may comprise comparing the electrical conductivity or resistivity of the aircraft structure under test with a data set associated with stressed or damaged samples, the data set comprising data associated with samples having been subjected to different amounts of stress and/or damage. In this way, one can assess the integrity of the aircraft structure, for example, estimate the stress and/or damage to which the sample under test has been subjected, and may optionally be used to estimate remaining operational life of the aircraft structure.

The method may comprise determining a first set of electrical conductivities or resistivities, and comparing the first set of electrical conductivities or resistivities with a set of one or more pre-determined values indicative of those from stressed or damaged samples. The first set of electrical conductivities may comprise determining electrical conductivity at a plurality of spatially-separated positions on the aircraft structure. The method may comprise comparing each determination of the first set of electrical conductivities with one or more pre-determined values indicative of those from stressed or damaged samples. Therefore, we can use a spatially-distributed array of electrical conductivities to assess the integrity of the aircraft structure, for example, to estimate the stress and/or damage to which the sample under test has been subjected, and also to estimate the remaining operational life of the aircraft structure. Once again, the first set of electrical conductivities or resistivities are typically obtained from a first side of a sample, and they are compared with pre-determined values that are indicative of values obtained from the same (first) side of a stressed or damaged sample.

Electrical conductivity or resistivity may be determined using an eddy current probe. Such probes may be suitable for determining electrical conductivity or resistivity in electrically-conductive non-ferrous materials.

Metal matrix composites comprise reinforcing elements dispersed in a metal matrix. The reinforcing elements may be continuous, for example, in the form of filaments. The reinforcing elements may comprise one or more of alumina, silicon carbide or carbon fibre. The metal matrix may comprise one or more of aluminium, titanium or magnesium, for example. The metal matrix may be formed from a substantially pure metal, for example, aluminium (with other elements being present in an acceptable amount), or the matrix may be formed from an alloy. The method of the first aspect of the present invention may be used to examine metal matrix composite formed using any suitable method, such as solid state formation, liquid state formation, semi-solid state formation, vapour formation and in-situ fabrication.

According to a second aspect of the present invention, there is also provided a method of estimating damage in an aircraft structure comprising metal matrix composite, the method comprising determining an electrical conductivity or resistivity of the metal matrix composite, and estimating damage to the aircraft structure from the electrical conductivity or resistivity.

The applicant has found that it is possible to estimate damage to the aircraft structure from an electrical conductivity or resistivity measurement.

According to a third aspect of the present invention, there is also provided a method of estimating the remaining operational life of an aircraft structure comprising metal matrix composite, the method comprising determining an electrical conductivity or resistivity of the metal matrix composite, and estimating the remaining operational life of the aircraft structure from the electrical conductivity or resistivity.

The applicant has found that it is possible to estimate damage to the aircraft structure from an electrical conductivity or resistivity measurement.

According to a fourth aspect of the present invention, there is also provided a method of determining the suitability of an aircraft structure comprising metal matrix composite, the method comprising determining an electrical conductivity or resistivity of the metal matrix composite, and determining whether or not the aircraft structure is suitable from the electrical conductivity or resistivity. The method may be a method of quality control of an aircraft structure.

The methods of the second, third and fourth aspects of the present invention may comprise any of the features of the method of the first aspect of the present invention. For example, the method of the second and third aspect of the invention may comprise comparing the electrical conductivity or resistivity with one or more pre-determined values indicative of those from stressed or damaged samples. The one or more pre-determined values indicative of those from stressed or damaged samples may be measured or calculated values. For example, the method may comprise comparing the electrical conductivity or resistivity with a data set associated with stressed or damaged samples, the data set comprising data associated with samples having been subjected to different amounts of stress and/or damage. In this way, one can estimate the stress and/or damage to which the sample under test has been subjected, and may optionally be used to estimate remaining operational life of the aircraft structure. The method of the fourth aspect of the present invention may comprise comparing the electrical conductivity or resistivity with one or more pre-determined values indicative of those from as-manufactured samples. For example, if the electrical conductivity or resistivity measurement taken from the sample is comparable to the one or more predetermined values indicative of those from as-manufactured samples, then the test sample may be determined to be suitable for use.

The methods of the first, second, third and fourth aspects of the present invention may be used on structures other than aircraft structures. For example, it may be possible to perform those methods on any metal matrix composite structure, not just an aircraft structure.

According to a fifth aspect of the present invention, there is also provided an apparatus configured to perform a method in accordance with the first aspect of the present invention. The apparatus comprises a computing device and a device for determining electrical conductivity or resistivity, configured to transmit electrical conductivity or resistivity data to the computing device. The computing device may be a mobile computing device, for example, such as a mobile phone, tablet or laptop computer. The computing device may be configured to process data received from the device for determining electrical conductivity or resistivity in order to assess the integrity of the aircraft structure.

According to a sixth aspect of the present invention, there is also provided an apparatus configured to estimate damage in an aircraft structure comprising metal matrix composite, the apparatus comprising a computing device and a device for determining electrical conductivity or resistivity, configured to transmit electrical conductivity or resistivity data to the computing device, the computing device being configured to estimate damage in the aircraft structure from electrical conductivity or resistivity data received from the device for determining electrical conductivity or resistivity. The apparatus of the sixth aspect of the present invention may be configured to perform the method of the second aspect of the present invention.

According to a seventh aspect of the present invention, there is also provided an apparatus configured to estimate the remaining operational life of an aircraft structure comprising metal matrix composite, the apparatus comprising a computing device and a device for determining electrical conductivity or resistivity, configured to transmit electrical conductivity or resistivity data to the computing device, the computing device being configured to estimate the remaining operational life of the aircraft structure from electrical conductivity or resistivity data received from the device for determining electrical conductivity or resistivity. The apparatus of the seventh aspect of the present invention may be configured to perform the method of the third aspect of the present invention.

It will of course be appreciated that features described in relation to one aspect of the present invention may be incorporated into other aspects of the present invention. For example, the method of the invention may incorporate any of the features described with reference to the apparatus of the invention and vice versa.

SUMMARY OF THE DRAWINGS

Embodiments of the present invention will now be described by way of example only with reference to the accompanying schematic drawings of which.

DETAILED DESCRIPTION

Figure 1:
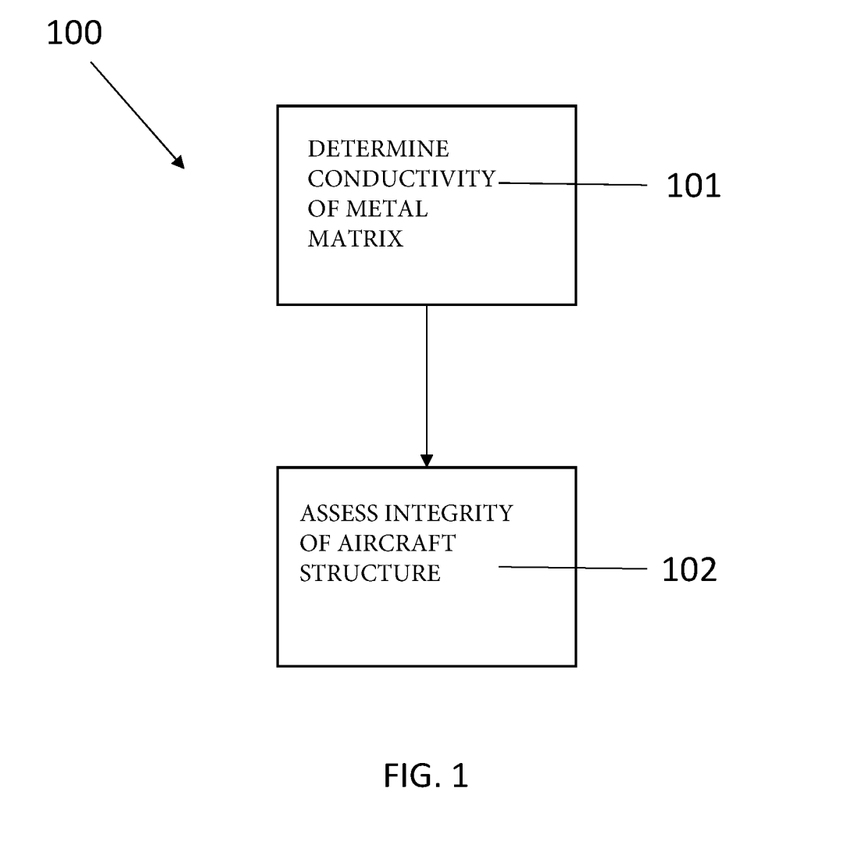
FIG. 1 shows a schematic representation of an example of an embodiment of a method according to the first aspect of the present invention.
Figure 2:
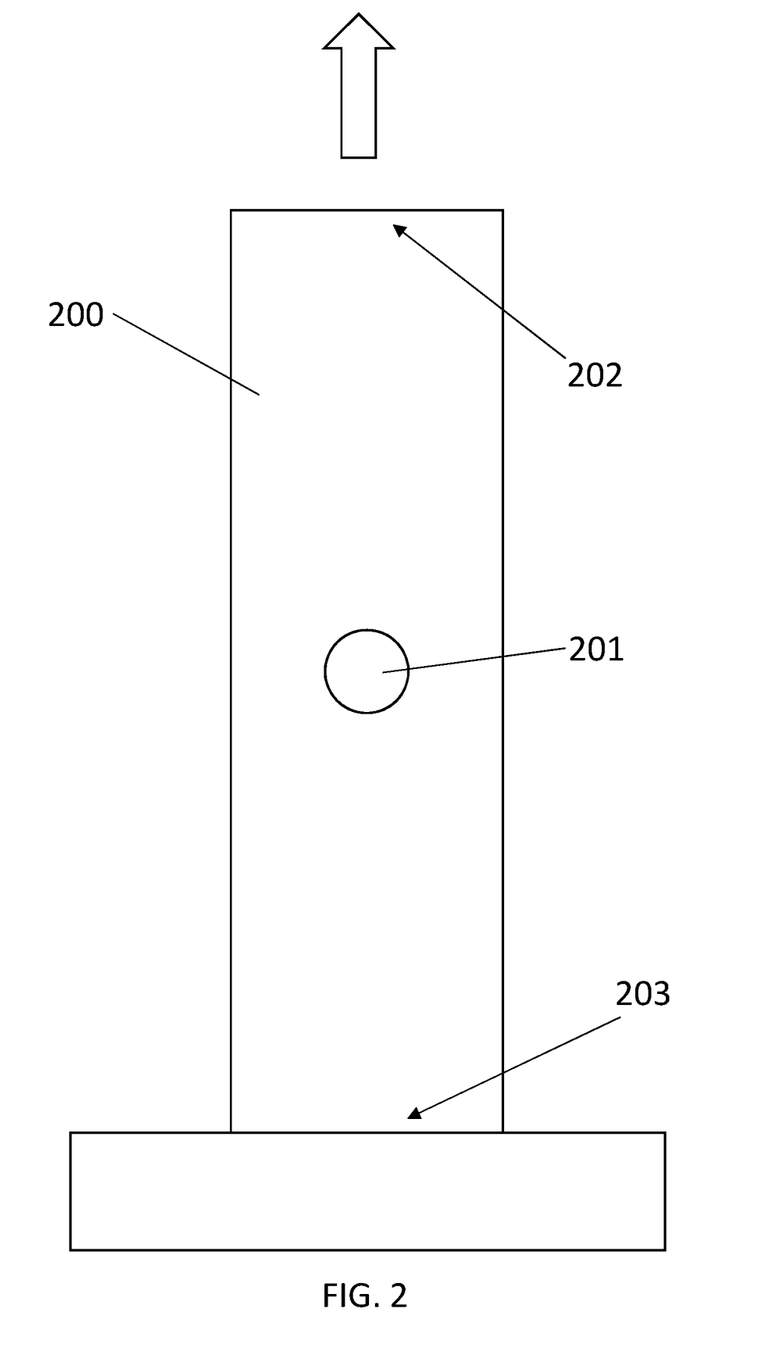
FIG. 2 shows a schematic plan view of a sample of metal matrix composite being subjected to stress.
Figure 3:
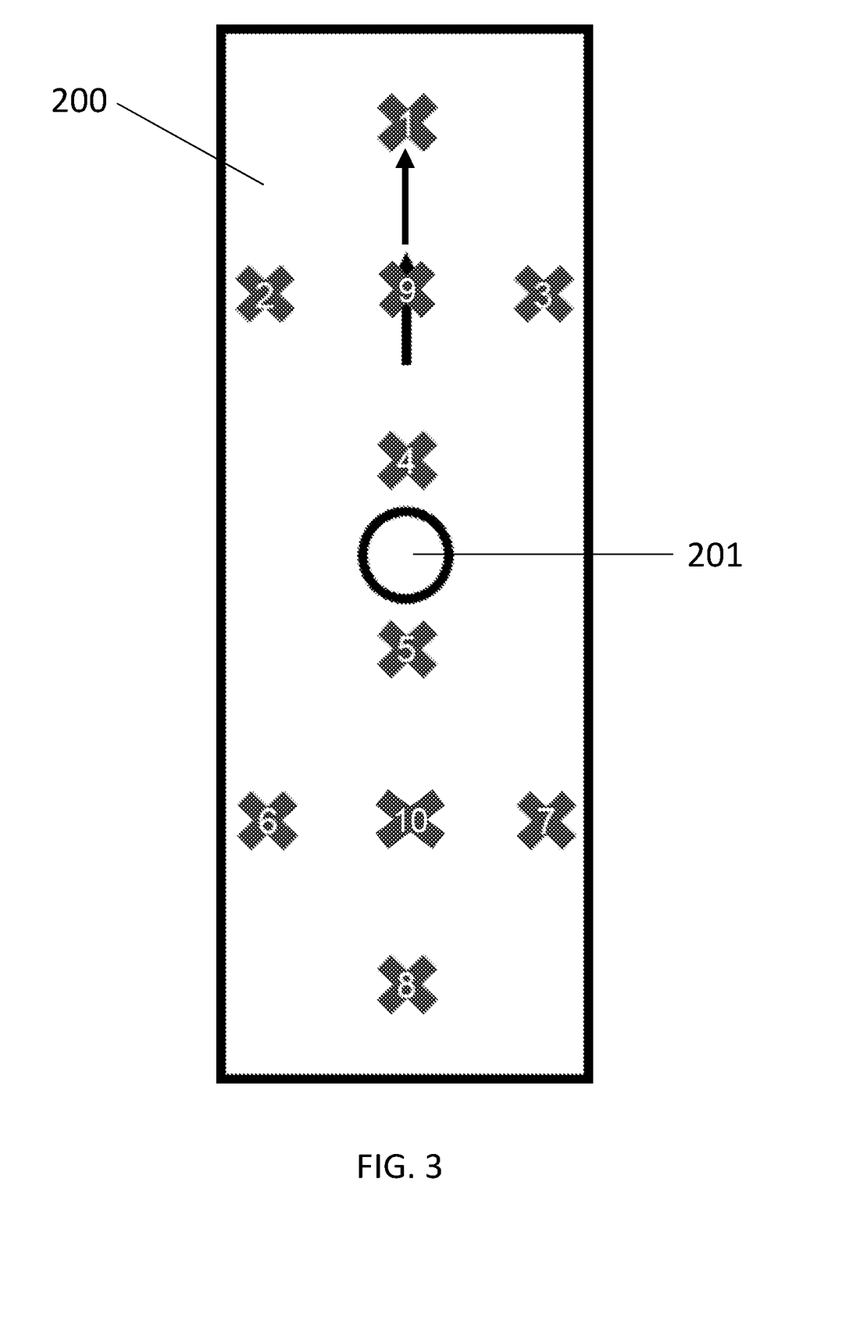
FIG. 3 shows a schematic plan view of a sample of metal matrix composite, indicating the positions of the electrical conductivity measurement sites.

An example of a method of examining the integrity of an aircraft structure comprising metal matrix composite in accordance with the first aspect of the present invention will now be described with reference to FIGS. 1, 2 and 3. Referring to FIG. 1, the method is denoted generally by reference numeral 100, and comprises determining 101 an electrical conductivity of the metal matrix composite. That determination 101 may then be used to assess 102 the integrity of the aircraft structure, for example, to estimate damage to the aircraft structure and/or remaining operational life of the aircraft structure.

In the present examples, the aircraft structures under examination were coupons, such as those conventionally used in constant amplitude fatigue testing. The samples were subjected to repeated stress in accordance with DIN EN 6072 (constant amplitude fatigue testing). Referring to FIG. 2, a sample 200 (known as a coupon) was fixed at a first end 203 and a force applied to a second end 202 of the sample 200 in a direction along the length of the sample as shown by the arrow. The force was applied multiple times, as usual for fatigue testing. The sample 200 was 150 mm long, 30 mm wide and 3 mm thick. A hole 201 of 10 mm diameter was formed in the centre of the sample. Each sample used comprised continuous reinforcing elements in the form of alumina filaments dispersed in an aluminium matrix. Each sample was prepared by squeeze casting. Those skilled in the art will realise that other metals and/or reinforcing elements may be used. Three samples were studied, along with an as-manufactured control sample that had not been subjected to fatigue testing, and details of those samples are shown below in Table 1. In each case, a force was applied to the sample a number of times, and released to a tenth of its value (corresponding to an R-value of 0.1, as is usually the case for this type of testing). It should be noted that none of Samples 1-3 had failed i.e. there was no gross failure of the structure.

TABLE 1 samples subjected to electrical conductivity measurements

| Sample No. | Force applied to sample (kN) | No. of times force applied to sample |
| --- | --- | --- |
| 1 | 26.85 | 1,146,159 |
| 2 | 28.07 | 1,729,542 |
| 3 | 11.09 | $>10^7$ |
| Control | 0 | 0 |

Figure 4:
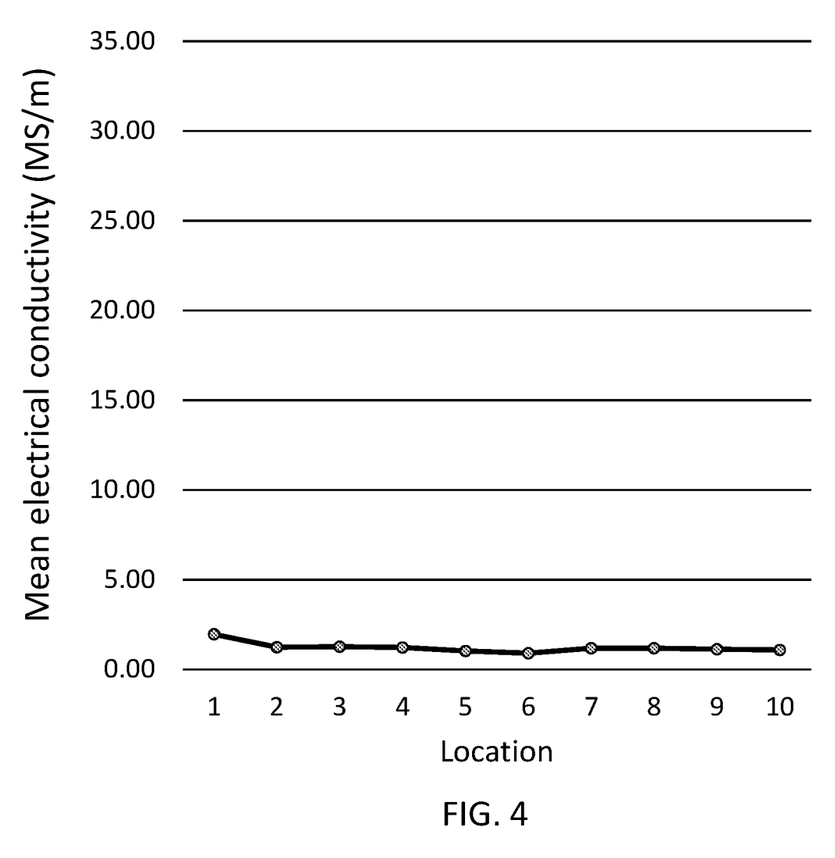
FIG. 4 shows the electrical conductivity measurements taken from a sample prior to loading cyclically towards the introduction of metal fatigue, the positions of the electrical conductivity measurement sites being indicated in FIG. 3.

Electrical conductivity measurements were performed on Samples 1-3 and the Control using a Sigmatest 2.069 electrical conductivity meter (Foerster Instruments Incorporated, Pittsburgh, USA). Ten measurements were taken at each of ten positions on the same side of a sample using a measurement frequency of 960 kHz, the positions being shown as reference numerals 1-10 on sample 200 in FIG. 3, and the mean value calculated for each position. FIG. 4 shows the electrical conductivity measurements taken from the control sample (an as-manufactured sample that had not been subjected to fatigue testing). The electrical conductivity at each measurement position was approximately constant at about 1-2 MS/m. Measurements were also performed at 60 kHz, but those measurements were found to be less satisfactory than at 960 kHz, likely due to better penetration of the sample by the 960 kHz measurement signal.

Figure 5:
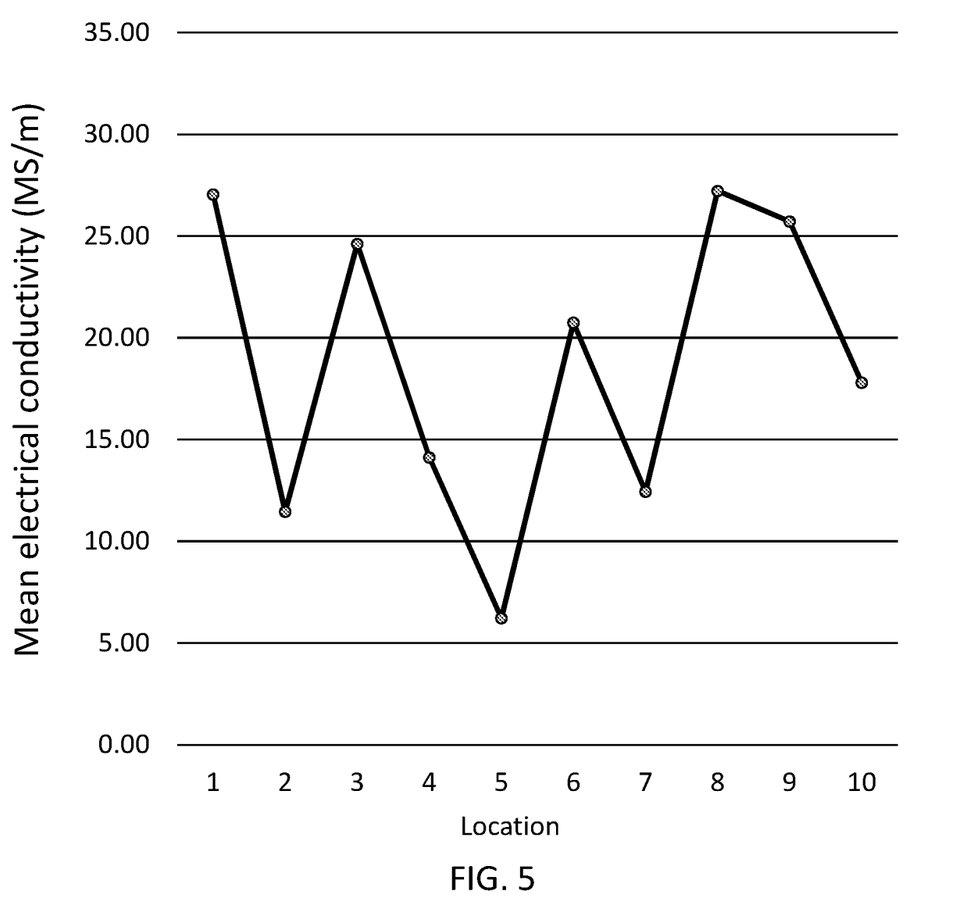
FIG. 5 shows the electrical conductivity measurements taken from a first sample subjected to stress by cyclic loading, the positions of the electrical conductivity measurement sites being indicated in FIG. 3.

Mean electrical conductivity measurements for Sample 1 are shown in FIG. 5. Electrical conductivity is higher at all measurement sites than for the control. Furthermore, electrical conductivity is higher at positions 1, 3, 6 and 8 than at other positions. Greater variation between measurements was observed at positions 4 and 7.

Figure 6:
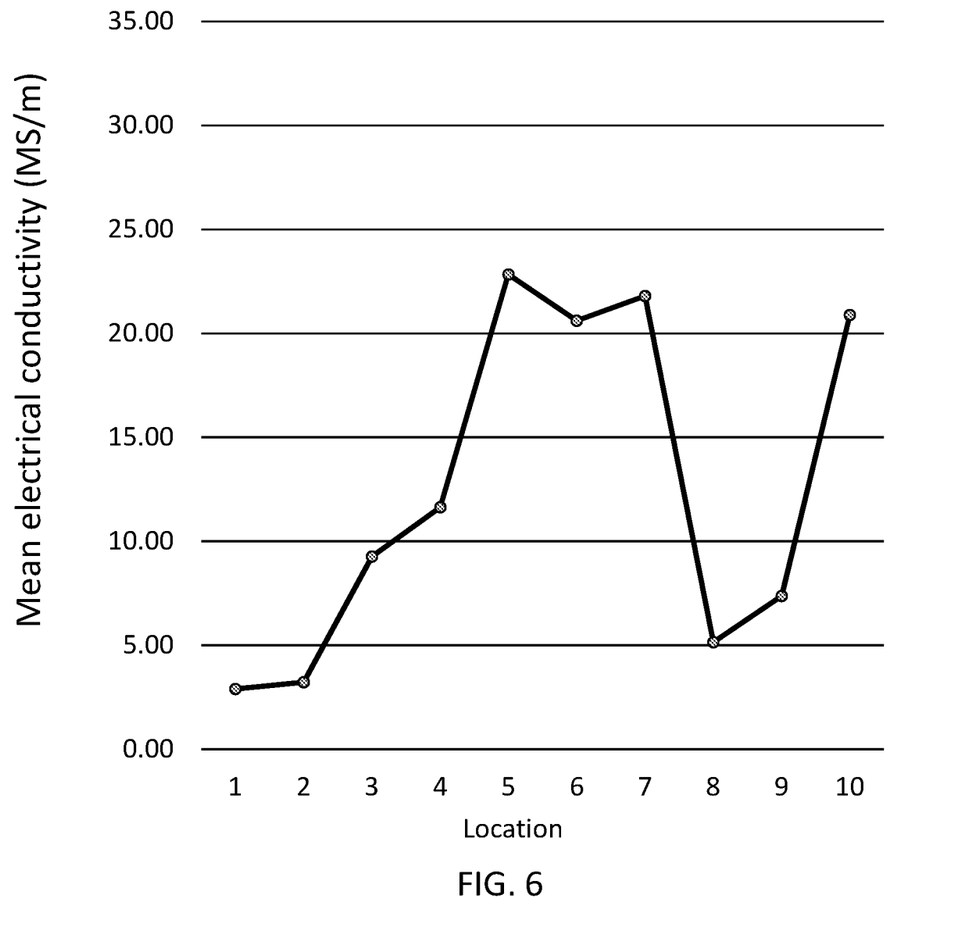
FIG. 6 shows the electrical conductivity measurements taken from a second sample subjected to stress by cyclic loading, the positions of the electrical conductivity measurement sites being indicated in FIG. 3.

Mean electrical conductivity measurements for Sample 2 are shown in FIG. 6. As for Sample 1, electrical conductivity is higher at all measurement sites than for the control, although not markedly higher in positions 1, 2 and 8. Furthermore, electrical conductivity is higher at positions 3, 4, 5, 6 and 7 than at other positions, and markedly higher in the case of positions 5, 6 and 7. Greater variation between measurements was observed at positions 3 and 6.

Figure 7:
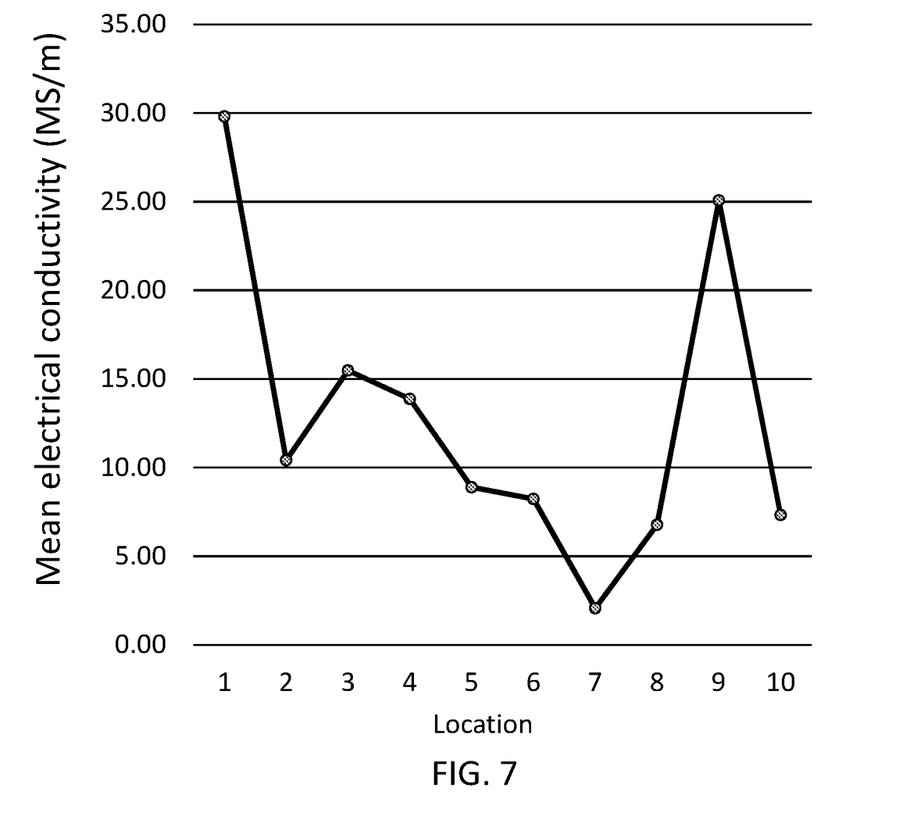
FIG. 7 shows the electrical conductivity measurements taken from a third sample subjected to stress by cyclic loading, the positions of the electrical conductivity measurement sites being indicated in FIG. 3.

Mean electrical conductivity measurements for Sample 3 are shown in FIG. 7. As for Samples 1 and 2, electrical conductivity is higher at all measurement sites than for the control, with the possible exception of measurement site 7. Furthermore, electrical conductivity is higher at positions 1, 2, 3, 4 and 6, and markedly higher in the case of position 1. Greater variation between measurements was observed at positions 2, 3 and 6.

Without wishing to be bound by theory, it is anticipated that damage to the sample is associated with a higher electrical conductivity, and the determination of a raised electrical conductivity compared to a pre-determined control conductivity is indicative of microscopic damage to the sample. As mentioned above, Samples 1-3 have not failed i.e. they have not undergone a gross structural failure. Once again, without wishing to be bound by theory, it is anticipated that microscopic damage to the sample may take several forms, such as void formation in the matrix, crack formation in the matrix, breakage of the reinforcing members and separation of the reinforcing members from the matrix.

Figure 8:
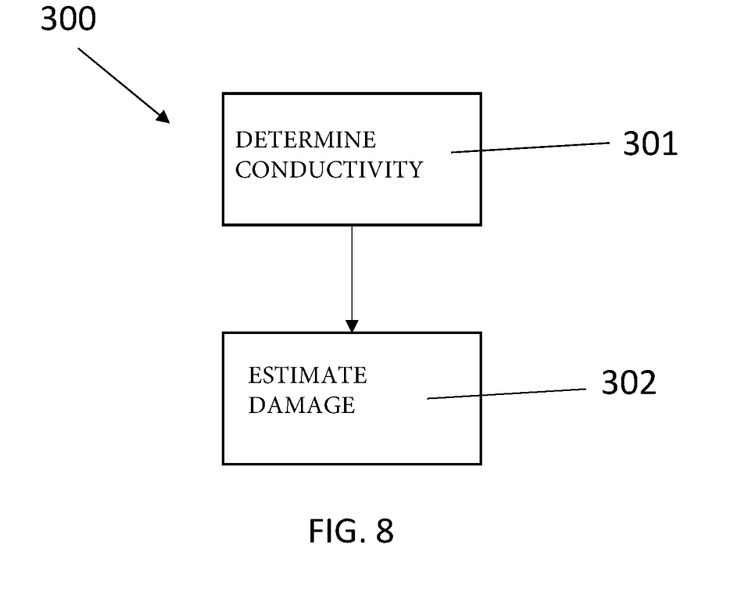
FIG. 8 shows a schematic representation of an example of an embodiment of a method of estimating damage according to the second aspect of the present invention.
Figure 10:
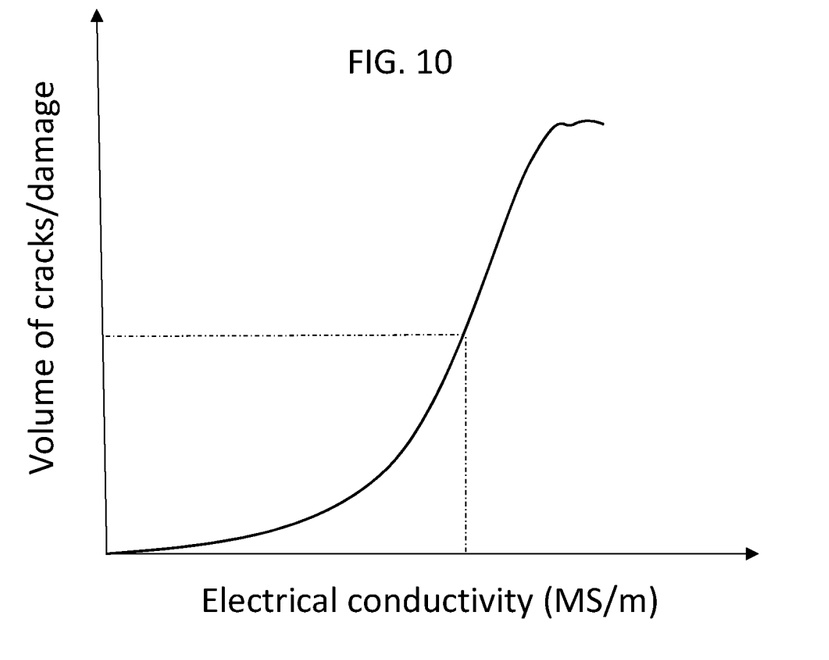
FIG. 10 shows a schematic representation of how a measured electrical conductivity may be related to damage to an aircraft structure.

A raised value of electrical conductivity at a particular point compared to a control may be indicative of damage to a sample. Furthermore, raised values of electrical conductivity at a set of points may also be indicative of damage to a sample. Furthermore, the spatial pattern of said set of points comprising raised values of electrical conductivity may also be indicative of damage and/or indicative of a type of damage. In this connection, a method of estimating damage in an aircraft structure will now be described with reference to FIGS. 8 and 10. The method is denoted generally by reference numeral 300, and comprises determining 301 an electrical conductivity or resistivity of the metal matrix composite, and estimating 302 damage to the aircraft structure from the electrical conductivity or resistivity. FIG. 10 is a schematic representation of how electrical conductivity may be related to damage to the aircraft structure. In order to estimate damage to the aircraft structure, the method merely comprises using the electrical conductivity measurement to determine estimated damage. Such an estimation is typically performed automatically using a suitably-programmed computing device, such as that described below with reference to FIG. 12.

Once again, without wishing to be bound by theory, it is anticipated that measurement of electrical conductivity may facilitate the estimation of the remaining life of an aircraft structure. For example, a comparison may be made between the measured electrical conductivity and a pre-determined value indicative of a given percentage of a lifetime of an aircraft structure.

While it is anticipated that a single value of electrical conductivity at a particular point may be used to estimate the remaining life of an aircraft structure, it is also anticipated that a one or more values of electrical conductivity at each of a set of points may also be indicative of damage to a sample. Furthermore, the spatial pattern of said set of points may also be used to determine the remaining life of an aircraft structure.

Figure 9:
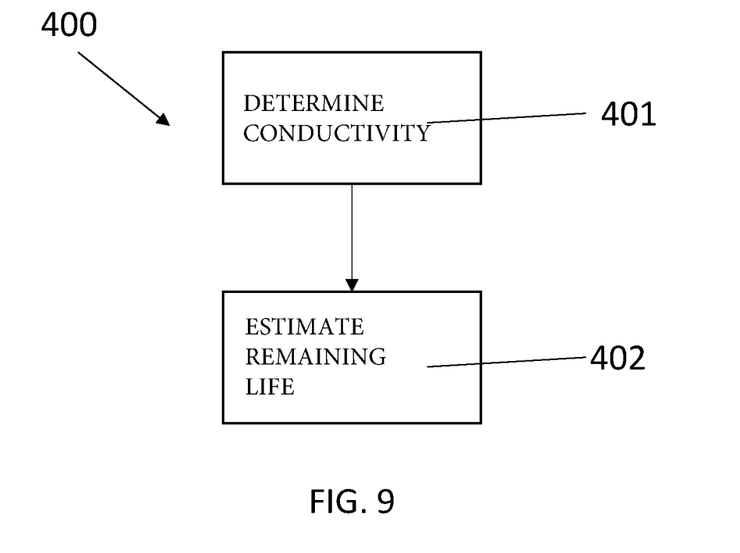
FIG. 9 shows a schematic representation of an example of an embodiment of a method of estimating the remaining operational life of an aircraft structure according to the third aspect of the present invention.
Figure 11:
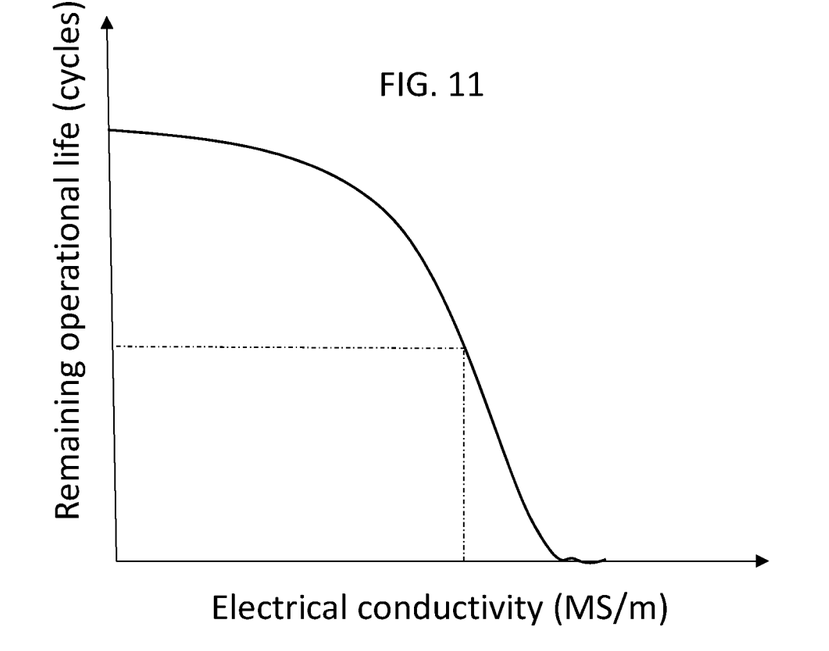
FIG. 11 shows a schematic representation of how a measured electrical conductivity may be related to remaining operational life of an aircraft structure.

In this connection, a method of estimating the remaining operational life of an aircraft structure will now be described with reference to FIGS. 9 and 11. The method is denoted generally by reference numeral 400, and comprises determining 401 an electrical conductivity or resistivity of the metal matrix composite, and estimating 402 the remaining operational life of aircraft structure from the electrical conductivity or resistivity. FIG. 11 is a schematic representation of how electrical conductivity may be related to the remaining operational life of the aircraft structure. In order to estimate the remaining operational life of the aircraft structure, the method merely comprises using the electrical conductivity measurement to determine an estimated remaining operational life. Such an estimation is typically performed automatically using a suitably-programmed computing device, such as that described below with reference to FIG. 12.

Figure 12:
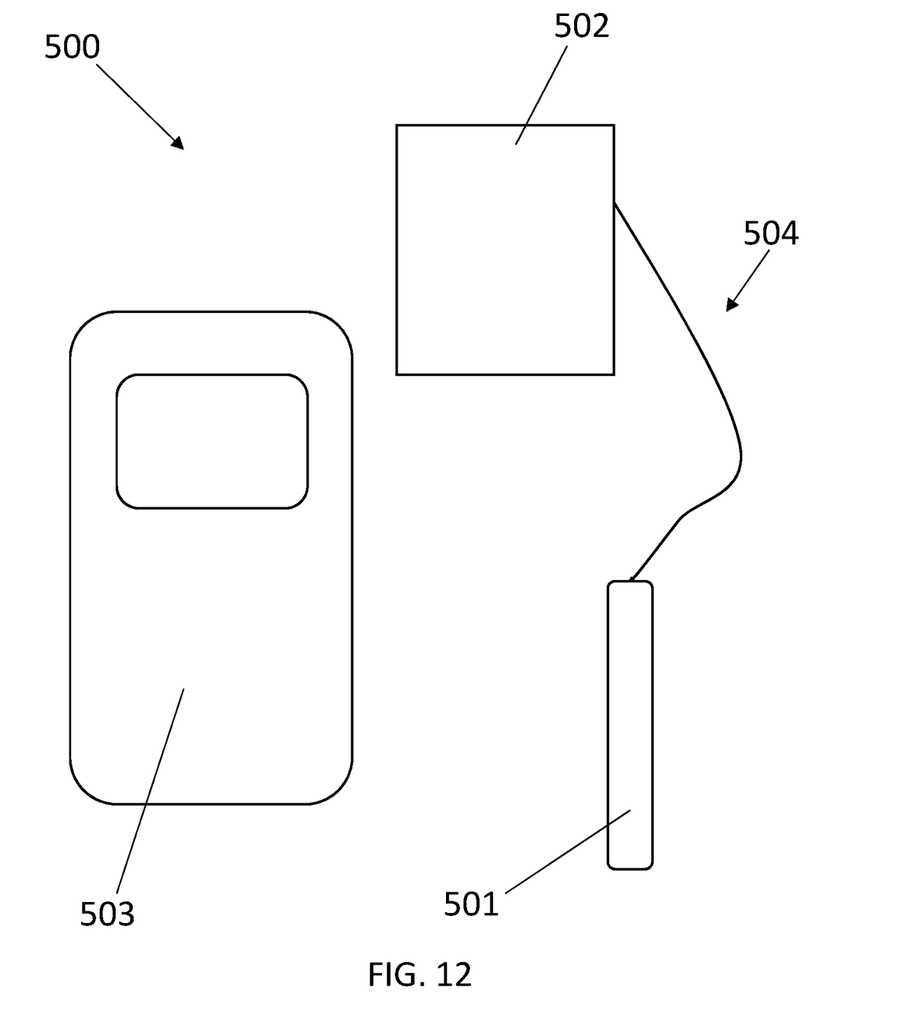
FIG. 12 shows a schematic representation of an example of an embodiment of an apparatus configured to estimate damage in an aircraft structure and to estimate the remaining operational life of an aircraft structure according to the sixth and seventh aspects of the present invention.

An example of an apparatus configured to estimate damage to an aircraft structure and to determine the remaining operational life of an aircraft structure will now be described with reference to FIG. 12. The apparatus is denoted generally by reference numeral 500, and comprises a probe 501 in communication with a handset 502. The probe is an eddy current probe, such as those that are typically used to measure the electrical conductivity of a conductive, non-ferrous material. The handset 502 is configured to process signals provided by the probe 501. Together the handset 502 and probe 501 form a device 504 for determining electrical conductivity. One such device is the Sigmatest 2.069. The handset 502 is configured to transmit data to a handheld device 503, in this case a smartphone. The smartphone 503 is configured to estimate damage to an aircraft structure by comparing data received from device 504 with pre-determined data, as indicated above in relation to the methods of the present invention. The smartphone 503 is further configured to estimate the remaining operational life of an aircraft structure by comparing data received from device 504 with pre-determined data, as indicated above in relation to the methods of the present invention. The smartphone 503 is configured to communicate the estimated damage and/or the estimated remaining operational life to a user, for example, by visual means or by audio means.

Figure 13:
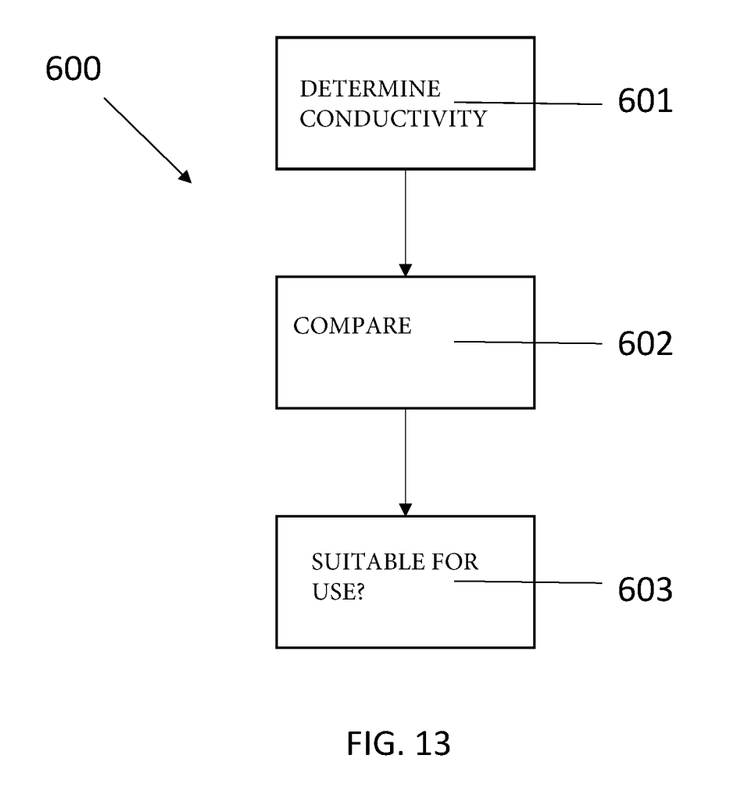
FIG. 13 shows a schematic representation of an example of an embodiment of a method of determining the suitability of an aircraft structure comprising metal matrix composite according to the fourth aspect of the present invention.

A method of determining the suitability of an aircraft structure comprising metal matrix composite will now be described with reference to FIG. 13. The method is denoted generally by reference numeral 600, and comprises determining 601 an electrical conductivity or resistivity of the metal matrix composite, comparing 602 the electrical conductivity or resistivity with one or more pre-determined values indicative of those from one or more as-manufactured samples and from that comparison determining 603 whether the sample is suitable for use. The pre-determined value may be a measured or calculated value that is stored electronically, for example, on a database. Such an estimation is typically performed automatically using a suitably-programmed computing device, such as that described above with reference to FIG. 12.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above describe the measurement of electrical conductivity. Those skilled in the art will realise that electrical resistivity is the reciprocal of electrical conductivity, and therefore the methods and apparatus of the present invention may be used to determine electrical resistivity, instead of conductivity.

The examples above describe the use of a probe that uses the eddy current method to determine electrical conductivity. Those skilled in the art will realise that other types of probe or measurement techniques may be used.

The examples above describe the measurement of electrical conductivity in a metal matrix composite comprising an aluminium metal matrix. Those skilled in the art will realise that the methods and apparatus of the present invention may be used to examine MMCs comprising metals other than aluminium, such as aluminium alloys, titanium and magnesium.

Those skilled in the art will realise that the apparatus and methods of the present invention may be used to examine MMCs comprising reinforcing elements made from materials other than alumina.

The MMC in the examples above is made using squeeze casting. Those skilled in the art will realise that the apparatus and methods of the present invention may be used to examine MMCs that are made using techniques other than squeeze casting.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of examining integrity of an aircraft structure comprising a metal matrix composite, the method comprising:
   determining, at a first point in time, a first spatial pattern of a first set of electrical conductivities or resistivities of the metal matrix composite, thereby determining an electrical conductivity or resistivity at a plurality of spatially-separated positions of the metal matrix composite, wherein the first spatial pattern corresponds to the spatially separated positions of the metal matrix composite, and
   determining a second spatial pattern of a second set of electrical conductivities or resistivities at a second point in time, wherein the aircraft structure having been subjected to stress between the first point in time and the second point in time,
   comparing the first spatial pattern to the second spatial pattern,
   assessing the integrity of the aircraft structure based on the comparison of the first spatial pattern and the second spatial pattern.

2. The method of claim 1, further comprising comparing the first spatial pattern of the first set of electrical conductivities or resistivities to a set of electrical conductivities or resistivities indicative of an as-manufactured aircraft structure.

3. The method of claim 1, further comprising comparing the first spatial pattern of the first set of electrical conductivities or resistivities with a value indicative of an electrical conductivity or resistivity of an as-manufactured aircraft structure, and based on said comparison, assessing the integrity of the aircraft structure.

4. The method of claim 1, further comprising comparing the first spatial pattern of the first set of electrical conductivities or resistivities with one or more pre-determined values indicative of those from stressed or damaged samples, and from said comparison assessing the integrity of the aircraft structure.

5. The method of claim 1, further comprising:
   comparing the first spatial pattern of the first set of electrical conductivities or resistivities with a set of pre-determined values indicative of those from stressed or damaged samples,
   wherein the comparison includes comparing each of the conductivities or resistivities in the first set of electrical conductivities or resistivities with a corresponding one of the pre-determined values in the set of the predetermined values.

6. The method of claim 1, wherein the metal matrix composite comprises reinforcing elements dispersed in a metal matrix, and wherein the reinforcing elements are continuous.

7. The method of claim 6, wherein the reinforcing elements comprise one or more of alumina, silicon carbide or carbon fiber.

8. The method of claim 5, wherein the metal matrix composite comprises one or more of aluminum, titanium or magnesium.

9. The method of claim 1, wherein the assessing of the integrity of the aircraft structure comprises estimating damage to the aircraft structure.

10. The method of claim 1, wherein the assessing of the integrity of the aircraft structure comprises estimating the remaining operational life of the aircraft structure.

11. A method comprising:
    determining a first spatial pattern of a first set of electrical conductivities or resistivities at a first point in time, wherein the electrical conductivities or resistivities in the first set are determined at a plurality of spatially-separated positions on a metal matrix composite in an aircraft structure and the first spatial pattern corresponds to the spatially separated positions of the metal matrix composite,
    determining a second spatial pattern of a second set of electrical conductivities or resistivities at a second point in time, wherein the second set includes determined electrical conductivities or resistivities determined at the plurality of spatially-separated positions and wherein the aircraft structure having been subjected to stress between the first point in time and the second point in time,
    comparing the first spatial pattern of the first set of electrical conductivities or resistivities with the second spatial pattern of the second set of electrical conductivities or resistivities,
    performing at least one of:
    (i) estimating damage to the aircraft structure based on the comparison of the first spatial pattern and the second spatial pattern,
    (ii) estimating a remaining operational life of the aircraft structure based on the comparison of the first spatial pattern and the second spatial pattern, or
    (iii) determining an integrity of the aircraft structure based on the comparison of the first spatial pattern and the second spatial pattern.

12. A system configured to: (i) assess an integrity of an aircraft structure comprising metal matrix composite, (ii) estimate damage in the aircraft structure comprising the metal matrix composite and/or (iii) estimate a remaining operational life of the aircraft structure comprising the metal matrix composite, the system comprising:
    a device configured to:
        determine a first spatial pattern of a first set of electrical conductivities or resistivities of the metal matrix composite at a first point in time, wherein the first set includes determined electrical conductivities or resistivities determined at a plurality of spatially-separated positions on the aircraft structure and the first spatial pattern corresponds to the spatially separated positions of the metal matrix composite,
        determine a second spatial pattern of a set of electrical conductivities or resistivities at a second point in time, wherein the second set includes determined electrical conductivities or resistivities at the plurality of spatially-separated positions and wherein the aircraft structure having been subjected to stress between the first point in time and the second point in time, and a computing device configured to:

compare the first spatial pattern of the first set of electrical conductivities or resistivities with the second spatial pattern of the second set of electrical conductivities or resistivities, and perform at least one of:
(i) assess the integrity of the aircraft structure based on the comparison of the first spatial pattern with the second spatial pattern,
(ii) estimate the damage in the aircraft structure based on the comparison of the first spatial pattern with the second spatial pattern, or
(iii) estimate the remaining operational life of the aircraft structure based on comparison of the first spatial pattern with the second spatial pattern.

\* \* \* \* \*